(12) United States Patent
Tschirdewahn et al.

(10) Patent No.: US 11,980,127 B2
(45) Date of Patent: May 14, 2024

(54) FORAGE HARVESTER

(71) Applicant: AGCO International GmbH, Neuhausen (CH)

(72) Inventors: Wilhelm Tschirdewahn, Marktoberdorf (DE); Helge Lindenmüller, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 350 days.

(21) Appl. No.: 17/645,881

(22) Filed: Dec. 23, 2021

(65) Prior Publication Data

US 2022/0192093 A1   Jun. 23, 2022

(30) Foreign Application Priority Data

Dec. 23, 2020 (GB) .................................... 2020465

(51) Int. Cl.
*A01D 43/08* (2006.01)
*A01F 29/09* (2010.01)

(52) U.S. Cl.
CPC .......... *A01D 43/088* (2013.01); *A01F 29/095* (2013.01)

(58) Field of Classification Search
CPC .................. A01D 43/088; A01F 29/095
See application file for complete search history.

(56) References Cited

U.S. PATENT DOCUMENTS

| | | | | |
|---|---|---|---|---|
| 2,829,481 A | * | 4/1958 | Gordon | A01F 29/095 56/14.4 |
| 2,864,224 A | * | 12/1958 | West | A01D 43/088 56/2 |
| 3,135,307 A | * | 6/1964 | Blanshine | A01F 29/095 56/294 |
| 3,191,367 A | * | 6/1965 | Schwalm | A01D 43/08 56/DIG. 1 |
| 3,191,373 A | * | 6/1965 | Schwalm | A01D 43/08 56/504 |

(Continued)

FOREIGN PATENT DOCUMENTS

| | | | | |
|---|---|---|---|---|
| CN | 103858594 A | * | 6/2014 | ......... A01D 41/1261 |
| CN | 107155532 A | * | 9/2017 | ............. A01F 12/28 |

(Continued)

OTHER PUBLICATIONS

UK Intellectual Property Office, Search report for related UK Application No. GB2020465. 7, dated May 21, 2021.

(Continued)

*Primary Examiner* — Alicia Torres
*Assistant Examiner* — Ashley A Kaercher

(57) ABSTRACT

A chopper drum assembly for a forage harvester including a chopper drum housing, a shear bar, a shear bar holder and a wear plate assembly. The chopper drum housing includes a first part and a wear plate assembly support surface. The shear bar holder is pivotally connected at a first end to the first part of the chopper drum housing and fixedly connected to the shear bar at a second end. A first end of the wear plate assembly is pivotally connected to the second end of the shear bar holder adjacent the shear bar, and a second end of the wear plate assembly is supported by the wear plate assembly support surface wherein, the wear plate support surface is arranged to be inclined to the horizontal.

7 Claims, 5 Drawing Sheets

(56) References Cited

U.S. PATENT DOCUMENTS

| | | | | |
|---|---|---|---|---|
| 4,061,284 | A | * 12/1977 | Raisbeck | A01F 29/06 241/222 |
| 4,257,566 | A | * 3/1981 | Lawrence | A01F 29/095 241/294 |
| 5,704,562 | A | * 1/1998 | Wagstaff | A01F 29/095 241/294 |
| 5,779,167 | A | * 7/1998 | Wagstaff | A01F 29/095 241/242 |
| 5,979,150 | A | * 11/1999 | Klingler | A01F 29/09 83/698.21 |
| 6,430,909 | B1 | * 8/2002 | Clauss | A01F 29/22 56/250 |
| 11,109,537 | B2 | * 9/2021 | Neitemeier | G01B 7/293 |
| 2006/0130452 | A1 | * 6/2006 | Pakura | A01D 43/08 56/16.4 R |
| 2012/0293157 | A1 | * 11/2012 | Loebe | A01D 43/085 324/71.1 |
| 2014/0150393 | A1 | * 6/2014 | Stengele | A01F 29/095 56/60 |
| 2014/0157743 | A1 | * 6/2014 | Isfort | A01D 75/20 56/10.1 |
| 2014/0373501 | A1 | * 12/2014 | McLawhorn | A01F 29/09 56/500 |
| 2018/0279560 | A1 | * 10/2018 | Wehner | A01F 29/095 |
| 2019/0174680 | A1 | * 6/2019 | Neitemeier | A01F 29/095 |
| 2021/0368683 | A1 | * 12/2021 | Balg | A01D 43/08 |
| 2022/0192093 | A1 | * 6/2022 | Balg | A01F 29/095 |
| 2023/0232740 | A1 | * 7/2023 | Heitmann | A01D 43/085 460/1 |

FOREIGN PATENT DOCUMENTS

| | | | | |
|---|---|---|---|---|
| DE | 2220826 | C * | 1/1983 | A01D 34/52 |
| DE | 3318752 | A * | 11/1984 | A01F 29/06 |
| DE | 224 476 | A1 | 7/1985 | |
| DE | 4134957 | A1 * | 4/1993 | A01F 29/095 |
| DE | 19650058 | A1 * | 6/1998 | A01F 29/095 |
| DE | 19651694 | A1 * | 6/1998 | A01F 29/095 |
| DE | 29522128 | U1 * | 2/2000 | A01F 29/095 |
| DE | 19903153 | C1 * | 3/2000 | A01F 29/22 |
| DE | 19918553 | A1 * | 10/2000 | A01F 29/095 |
| DE | 19942399 | C1 * | 1/2001 | A01F 29/09 |
| DE | 19958455 | A1 * | 6/2001 | A01F 29/095 |
| DE | 10026296 | A1 * | 12/2001 | A01F 29/095 |
| DE | 10126280 | A1 * | 12/2002 | A01F 29/095 |
| DE | 102006020072 | A1 * | 11/2007 | A01D 43/08 |
| DE | 202010006714 | U1 * | 9/2010 | A01F 29/095 |
| DE | 102009046808 | A1 * | 5/2011 | A01F 29/095 |
| DE | 102012205337 | A1 * | 10/2013 | A01F 29/095 |
| DE | 102012220339 | A1 * | 5/2014 | A01D 43/08 |
| DE | 102012023431 | A1 * | 6/2014 | A01D 43/088 |
| DE | 10 2014 116494 | A1 | 5/2016 | |
| DE | 102014116494 | A1 * | 5/2016 | A01F 29/095 |
| DE | 20 2016 105162 | U1 | 10/2016 | |
| DE | 102015120308 | A1 * | 5/2017 | |
| DE | 102016222167 | A1 * | 12/2017 | |
| DE | 102016214758 | A1 * | 2/2018 | A01F 29/095 |
| DE | 102016123174 | A1 * | 5/2018 | A01F 29/06 |
| DE | 102017201160 | A1 * | 7/2018 | A01D 34/733 |
| DE | 102018211862 | A1 * | 1/2020 | A01F 29/22 |
| DE | 102018216320 | A1 * | 3/2020 | A01D 43/085 |
| DE | 102020125513 | A1 * | 3/2022 | A01F 29/095 |
| DE | 102020129795 | A1 * | 3/2022 | |
| DE | 102021112530 | A1 * | 11/2022 | |
| EP | 789994 | A1 * | 8/1997 | A01F 29/095 |
| EP | 1151661 | A1 * | 11/2001 | A01F 29/095 |
| EP | 1198982 | A1 * | 4/2002 | A01F 29/095 |
| EP | 1110446 | B1 * | 2/2004 | A01F 29/095 |
| EP | 1442652 | A1 * | 8/2004 | A01D 43/08 |
| EP | 2298064 | A1 * | 3/2011 | A01F 29/06 |
| EP | 2363016 | A1 * | 9/2011 | A01D 43/088 |
| EP | 2425705 | A1 * | 3/2012 | A01D 34/62 |
| EP | 2559334 | A1 * | 2/2013 | A01D 43/085 |
| EP | 2 735 222 | A1 | 5/2014 | |
| EP | 2735222 | A1 * | 5/2014 | A01F 29/09 |
| EP | 2792230 | A1 * | 10/2014 | A01D 34/43 |
| EP | 2735222 | B1 * | 9/2015 | A01F 29/09 |
| EP | 2764767 | B1 * | 3/2018 | A01D 43/08 |
| EP | 3090623 | B1 * | 4/2018 | A01D 43/088 |
| EP | 3756441 | A1 | 12/2020 | |
| EP | 3756441 | A1 * | 12/2020 | A01D 43/08 |
| EP | 3363281 | B1 * | 2/2021 | A01F 15/08 |
| EP | 3915355 | A1 * | 12/2021 | A01D 43/08 |
| EP | 3915356 | A1 * | 12/2021 | A01D 34/43 |
| EP | 3915357 | A1 * | 12/2021 | A01D 43/08 |
| EP | 4018810 | A1 * | 6/2022 | A01D 43/085 |
| EP | 4018811 | A1 * | 6/2022 | A01D 43/081 |
| EP | 4176706 | A1 * | 5/2023 | A01D 43/08 |
| FR | 2757086 | A1 * | 6/1998 | A01F 29/09 |
| FR | 2832288 | A1 * | 5/2003 | A01F 29/095 |
| GB | 2018129 | A * | 10/1979 | A01F 29/095 |
| RU | 2548193 | C1 * | 4/2015 | A01D 43/088 |
| RU | 2016121516 | A * | 12/2017 | |
| RU | 2684304 | C2 * | 4/2019 | |
| WO | WO-2013114181 | A1 * | 8/2013 | A01D 43/088 |
| WO | WO-2018127556 | A1 * | 7/2018 | A01D 34/008 |
| WO | WO-2020064718 | A1 * | 4/2020 | A01D 43/086 |

OTHER PUBLICATIONS

European Patent Office, International Search Report related to International Patent Application No. EP 21207440.5, dated May 6, 2022.

\* cited by examiner

FORAGE HARVESTER

FIELD OF THE INVENTION

The present invention relates to an agricultural harvester, in particular a self-propelled forage harvester for use in cutting an agricultural crop, for example cutting corn and grass for stock feed and further in relation to a replaceable wear plate for such a harvester.

BACKGROUND

During operation of a forage harvester agricultural crop is fed into the forage harvester and comminuted or rendered into smaller particles on its passage through the forage harvester before being discharged. In particular a chopper drum rotatable about an axis is provided with knives about its circumference. The crop is fed to a chopper drum assembly in which the crop is cut between these knives and a shear bar located adjacent the chopper drum. In order to maintain the quality of the cut product, the knives must be sharpened from time to time. However, over time, sharpening of the blades, leads to reduction in the effective diameter of rotary path of the chopper drum knives. It is known to adjust the location of the shear bar towards the axis of rotation of the chopper drum in order to maintain the desired quality of the cut product.

Unfortunately, adjustment of the shear bar can also cause movement of other elements of the chopper drum assembly, where the reduced performance of these elements is accepted as a trade-off for maintaining the desired quality of the cut product.

It is an advantage of the present invention that it allows for adjustment of the shear bar without such a deleterious trade off.

SUMMARY OF THE INVENTION

According to a first aspect of the present invention, a forage harvester comprises a chopper drum assembly comprising a chopper drum housing, a shear bar, a shear bar holder and a wear plate assembly,
the chopper drum housing including a first part and a wear plate assembly support surface,
the shear bar holder having first and second ends being pivotally connected at the first end to the first part of the chopper drum housing and fixedly connected to the shear bar at the second end,
the wear plate assembly having first and second ends, the first end of the wear plate assembly being pivotally connected to the second end of the shear bar holder adjacent the shear bar, the second end of the wear plate assembly being supported by the wear plate assembly support surface,
characterised in that
the wear plate support surface is inclined to the horizontal.

Preferably, the wear plate support surface is provided by an upper surface of a wedge shaped element.

More preferably the wedge shaped element is adjustably secured to the chopper drum assembly.

Preferably the wedge shaped element is secured to the chopper drum by fasteners.

Preferably a spacer is located between the wedge shaped element and the chopper drum assembly.

Preferably the forage harvester further comprises an actuator to control movement of the shear bar holder about a pivot axis between the shear bar holder and the chopper drum housing.

More preferably the forage harvester further comprises an electronic control unit in electrical communication with the actuator to control operation of the actuator.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
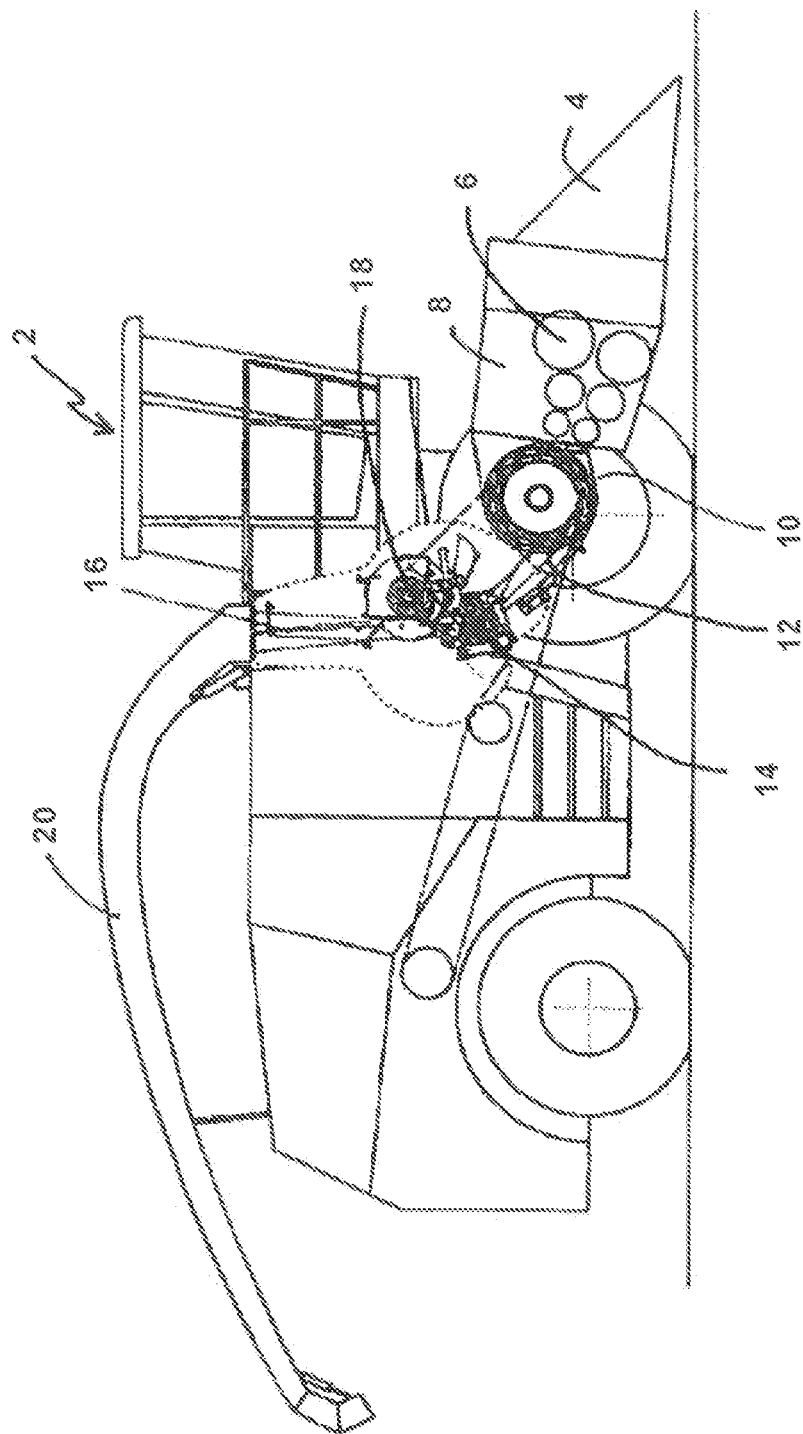
FIG. 1 shows a schematic side view of a forage harvester for use with the present invention.

With reference to FIG. 1, in a schematic side view the main components of a forage harvester 2 are shown. The forage harvester 2 is provided with a front attachment 4 which contains cutting equipment for cutting a crop. The cut crop is then fed through a series of compression rollers 6 in a compression roller housing 8 to a chopper drum assembly 10 where the crop is chopped into smaller pieces between a shear bar 30 and a plurality of chopper knives 24 mounted on a chopper drum 22. The chopped crop next passes through a first duct 12 and, in the illustrated embodiment, is fed through a cracker unit 14 where the crop is further crushed and threshed. The harvested crop is then blown upwards along a second duct 16 by an accelerator 18 and exits through a spout 20. In an alternative embodiment, the chopped crop may optionally pass directly from the chopper drum assembly 10 to the second duct 16.

In describing the present invention the term 'inner' is used to describe those elements of the invention which are, in use, closer to an axis of rotation of the chopper drum and 'outer' the opposite. Similarly references to 'upper' and 'lower' are to be understood with reference to the forage harvester in position on level ground.

Figure 2:
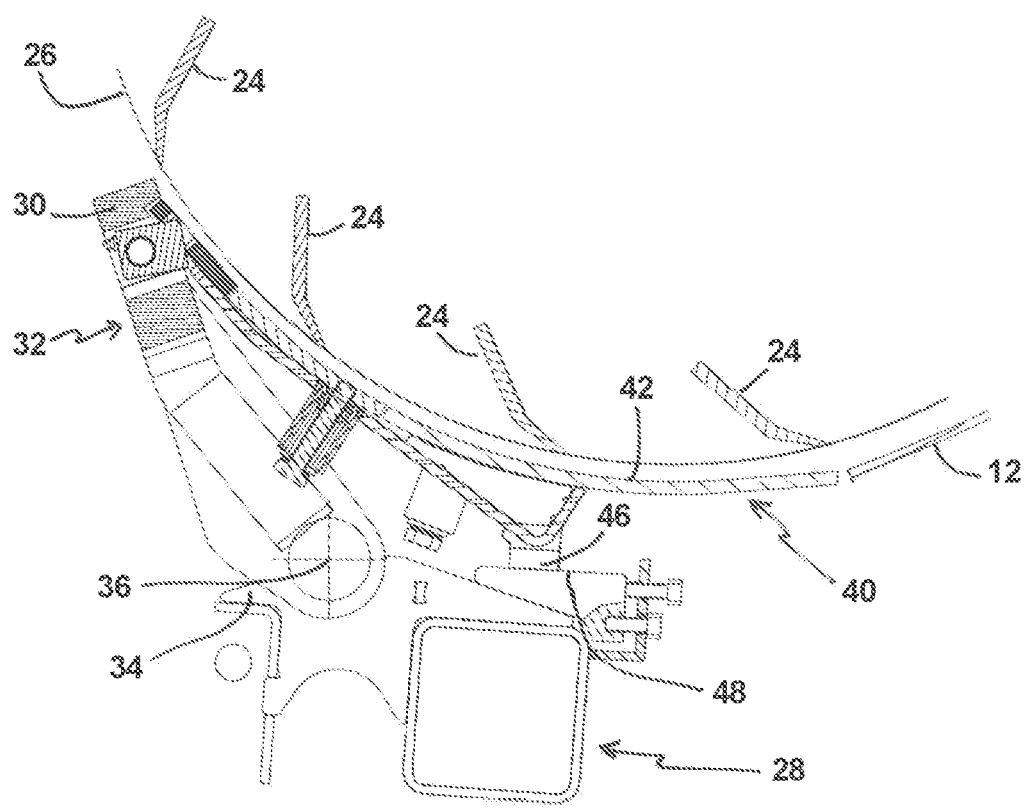
FIG. 2 shows a schematic side view of a part of a chopper drum assembly outside of the present invention.

FIG. 2 shows a schematic side view of a part of a chopper drum assembly outside of the present invention. Line 26 shows the rotary path of the knives 24 of the chopper drum 22. The chopper drum housing 28 includes frame elements for supporting some of the other elements of the chopper drum assembly 10.

It can be seen that a shear bar holder 32 is pivotally connected at a first end to a first part 34 of the chopper drum housing 28. The shear bar holder 32 is in this way adapted to pivot about a pivot axis 36. A second end of the shear bar holder 32 retains the shear bar 30.

A wear plate assembly 40 is provided between the shear bar 30 and an outlet of the chopper drum assembly (for example the first duct 12). The wear plate assembly 40 has an inner surface 42 facing the knives 24 of the chopper drum 22 and an outer surface. A first end of the wear plate assembly 40 is pivotally connected to the shear bar holder 32 in the region of the shear bar holder adjacent the shear bar. The wear plate assembly 40 is adapted to pivot with respect to the shear bar holder 32 about a pivot axis 44. The wear plate assembly 40 is provided on the outer side towards the second end of the wear plate assembly with a wear plate assembly support 46. A lower surface of the wear plate assembly support 46 is supported by a wear plate assembly support surface 48 provided on the chopper drum housing 28.

As the knives 24 become worn the shear bar holder 32 is moved inwards towards the rotary path of the worn knives, for example by an actuator 50. This in turn causes the wear plate assembly support 46 to be displaced along the wear plate assembly support surface 48 (horizontally towards the right in FIG. 2. This causes a gap between the inner surface of the wear plate assembly and the rotary path of the blades 24 at the second end of the wear plate assembly 40 to increase. This has the undesirable trade off that transport of the processed crop through the chopper drum assembly 10 is less effective.

While it is possible for an operator to adjust the position of the wear plate assembly support surface 48, this is a time consuming task as the wear plate assembly support surface 48 is difficult to access and must be accessed from beneath the forage harvester.

It is an advantage of the present invention that this problem is addressed.

Figure 3:
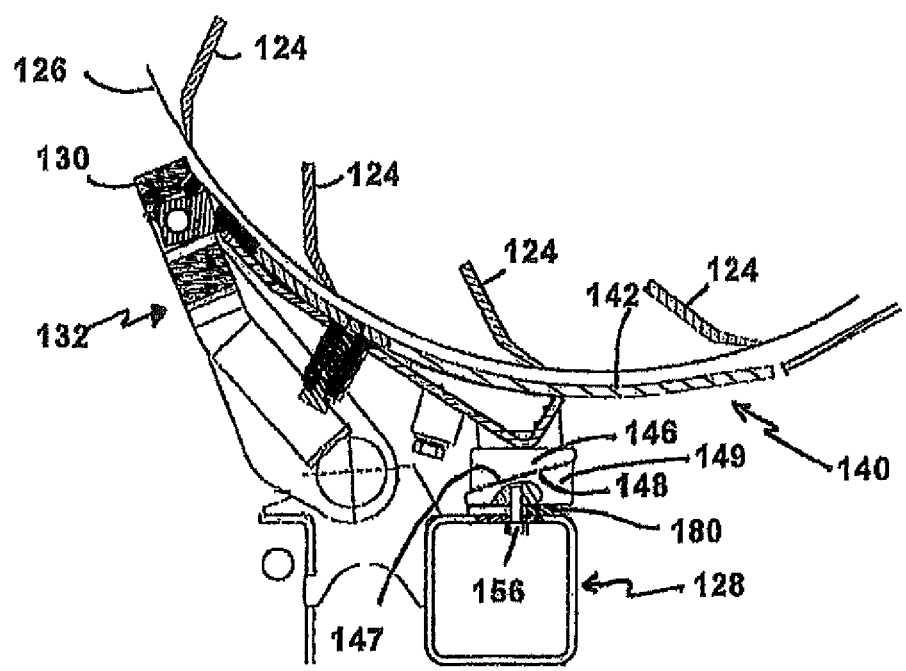
FIG. 3 shows a schematic side view of a part of a chopper drum assembly suitable for use with the present invention.
Figure 4:
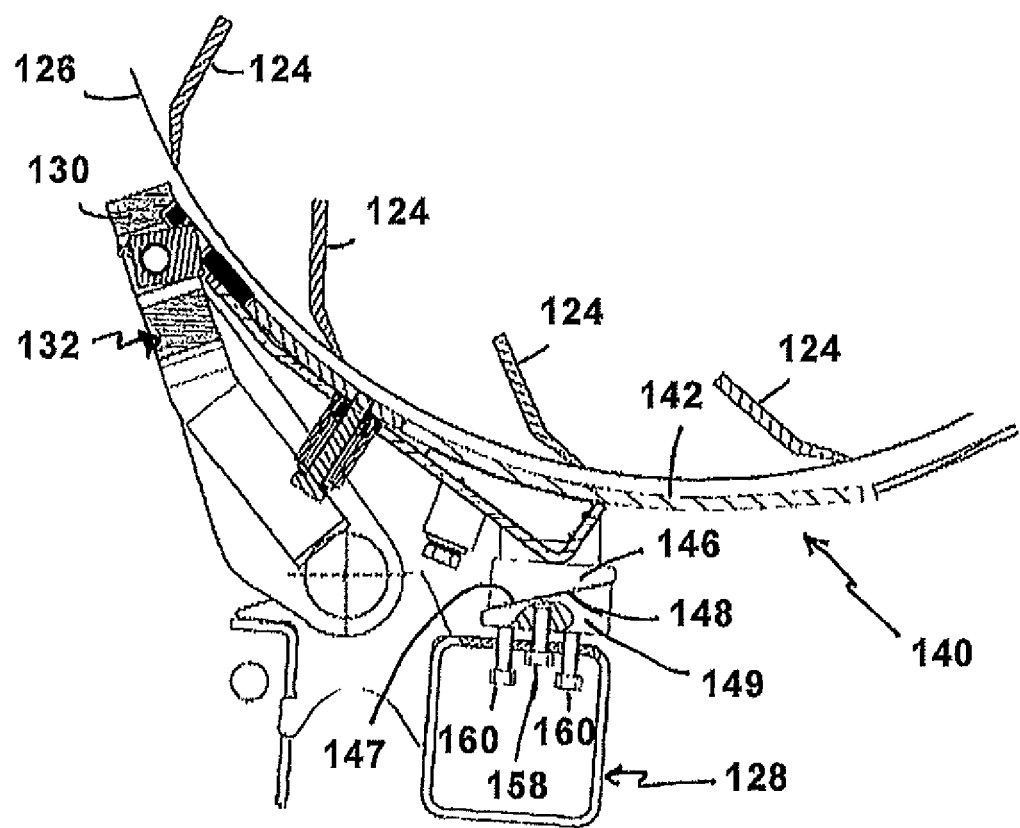
FIG. 4 shows a schematic side view of a part of a chopper drum assembly suitable for use with the present invention showing an alternative wear plate assembly support surface.

Turning to FIGS. 3 and 4, like parts have been provided with like reference numerals. The wear plate support surface 148 has been constructed such that it is inclined to the horizontal. The wear plate support 146 has similarly been amended such that a lower surface 147 of the of the wear plate support 146 is now inclined to the horizontal. The other elements of the chopper drum assembly 110 remain as described in FIG. 2.

In this embodiment according to the invention, when the shear bar holder 132 is pivoted, the wear plate support 146 is displaced both horizontally and upwards, thereby maintaining the gap between the inner surface 142 of the wear plate assembly 140 and the rotary path of the knives 124 of the chopper drum. This has the effect of maintaining the performance of the crop transport.

The structure of the wear plate support surface may take any suitable form. In FIG. 3, the wear plate support surface 148 is provided as the upper face of a wedge shaped element 149. The initial position of the wedge shaped element 149 with respect to the rest of the chopper drum housing 140 is determined by a spacer 180 of suitable dimensions located between the wedge shaped element and the chopper drum housing 128. Conventionally the wedge shaped element 149 and the spacer 180 are retained to the chopper drum housing 128 by one or more fasteners 156. The initial position of the wedge shaped element 149 is chosen to provide the desired location of the inner surface 142 of the wear plate assembly 140 with the rotary path 126 of the unworn knives 124.

In FIG. 4, the positioning of the wedge shaped element 149 is obtained by the use of two sets of fasteners: a first set of fasteners 158 secures the wedge shaped element to the chopper drum housing 128 and a second set of fasteners 160 are used to adjust the position of the wedge shaped element 149 and so the initial position of the wear plate assembly 140.

Figure 5:
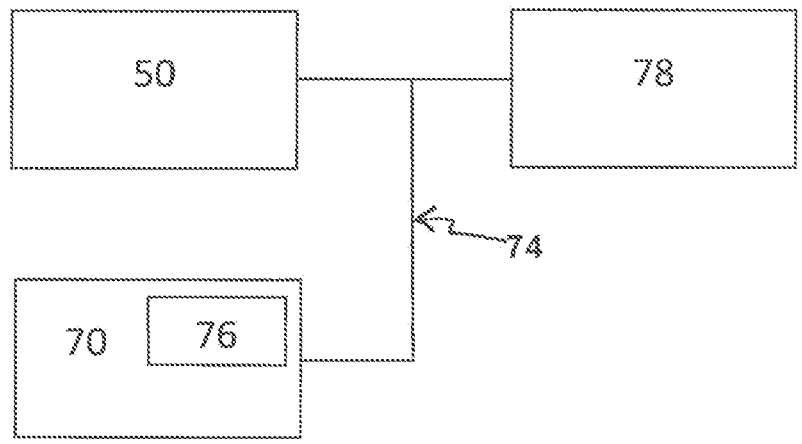
FIG. 5 shows a schematic view of elements of the forage harvester for use with the present invention.

The actuator 50 is in electronic communication with an electronic control unit 70 (FIG. 5). The electronic control unit 70 is also in electronic communication with a user terminal 72. The electronic control unit 70 may provide signals to control operation of the forage harvester 2. Conveniently the signals are provided by way of a suitable data communication network 74 such as one compliant with the ISOBUS standard (a network in conformance to ISO 11783).

The electronic control unit 70 may conveniently comprise a single processor located on the forage harvester or its functions may be split between multiple processors located on the forage harvester, any additional processor(s) being in electronic communication with a first processor.

The electronic control unit 70 is also able to access a suitable memory 76. The memory 76 may take any suitable form and is in electronic communication with the electronic control unit 70.

The electronic control unit 70 is also in electronic communication with a knock sensor 78 arranged in a suitable location on the forage harvester, for example mounted on the shear bar holder.

Figure 6:
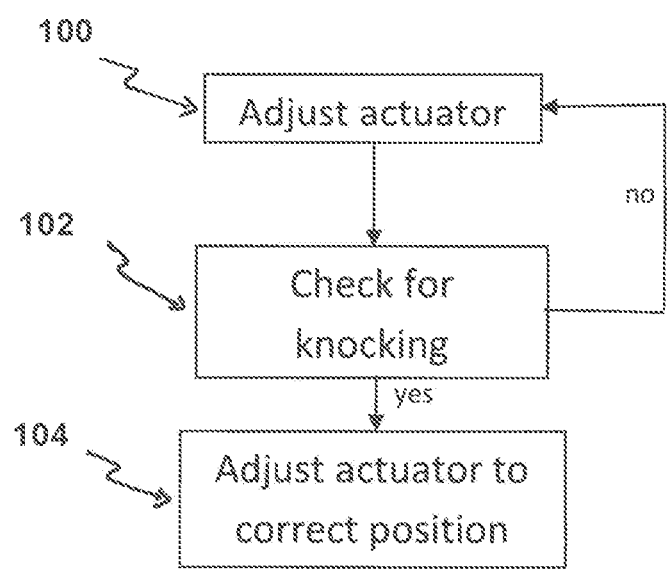
FIG. 6 shows a flow diagram in relation to operation of forage harvester implementing the present invention.

In operation the actuator 50 is adjusted to pivot the shear bar holder 32 towards the rotary path 26 of the knives 24 (step 100, FIG. 6). The knock sensor 78 detects whether the shear bar 30 is being contacted by the knives 24 (step 102). If no knocking is detected, the electronic control unit 70 continues to cause the shear bar holder 32 to pivot. If knocking is detected, the electronic control unit 70 causes the actuator 50 to pivot the shear bar holder 32 away from the rotary path 26 until a desired spacing between the shear bar 30 and the knives 24 has been achieved (step 104).

An operator may cause the electronic control unit 70 to adjust the spacing between the shear bar 30 and the knives 24 by operation of the user terminal 72. Alternatively, adjustment of the spacing between the shear bar 30 and the knives 24 may be programmed to occur after a sharpening operation to sharpen the knives has occurred. Alternatively, the adjustment of the spacing between the shear bar 30 and the knives 24 may be programmed to occur after an operator has adjusted the positioning of worn knives during maintenance of the forage harvester.

It will be understood that the spacing of the shear bar 30 from the rotary path of the knives may be determined by sensors other than the knock sensor.

From reading the present disclosure, other modifications will be apparent to persons skilled in the art. Such modifications may involve other features which are already known in the field of self-propelled forage harvesters and component parts therefore and which may be used instead of or in addition to features already described herein.

The invention claimed is:

1. A forage harvester comprising a chopper drum assembly comprising a chopper drum housing, a shear bar, a shear bar holder and a wear plate assembly, the chopper drum housing comprising a first part and a wear plate assembly support surface, the shear bar holder comprising first and second ends being pivotally connected at the first end to the first part of the chopper drum housing and fixedly connected to the shear bar at the second end, the wear plate assembly comprising first and second ends, the first end of the wear plate assembly being pivotally connected to the second end of the shear bar holder adjacent the shear bar, wherein the second end of the wear plate assembly is supported by the wear plate assembly support surface, and the wear plate support surface is inclined to the horizontal.

2. The forage harvester of claim 1, wherein the wear plate support surface comprises an upper surface of a wedge shaped element.

3. The forage harvester of claim 2, wherein the wedge shaped element is adjustably secured to the chopper drum assembly.

4. The forage harvester of claim 2, wherein the wedge shaped element is secured to the chopper drum assembly by fasteners.

5. The forage harvester of claim 2, wherein a spacer is located between the wedge shaped element and the chopper drum assembly.

6. The forage harvester of claim 1, further comprising an actuator to control movement of the shear bar holder about a pivot axis between the shear bar holder and the chopper drum housing.

7. The forage harvester of claim 6, further comprising an electronic control unit in electrical communication with the actuator to control operation of the actuator.

\* \* \* \* \*